Oct. 10, 1950     F. D. BRADDON ET AL     2,524,756
PRESETTING MEANS FOR GYROMAGNETIC COMPASSES
Filed March 31, 1945     3 Sheets-Sheet 1
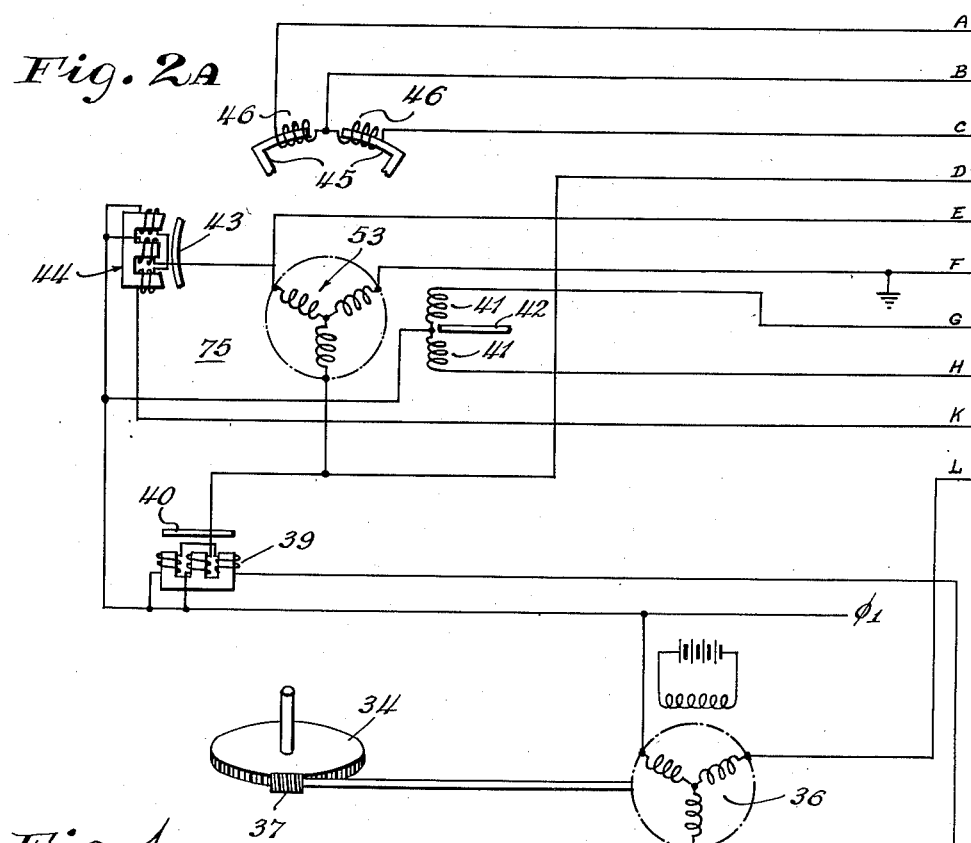
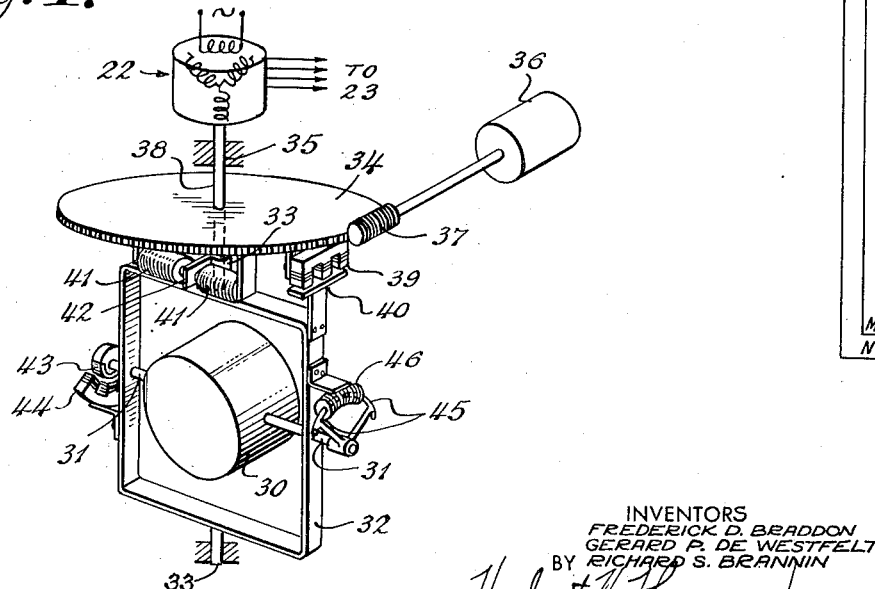
INVENTORS
FREDERICK D. BRADDON
GERARD P. DE WESTFELT
BY RICHARD S. BRANNIN
Herbert ATTORNEY

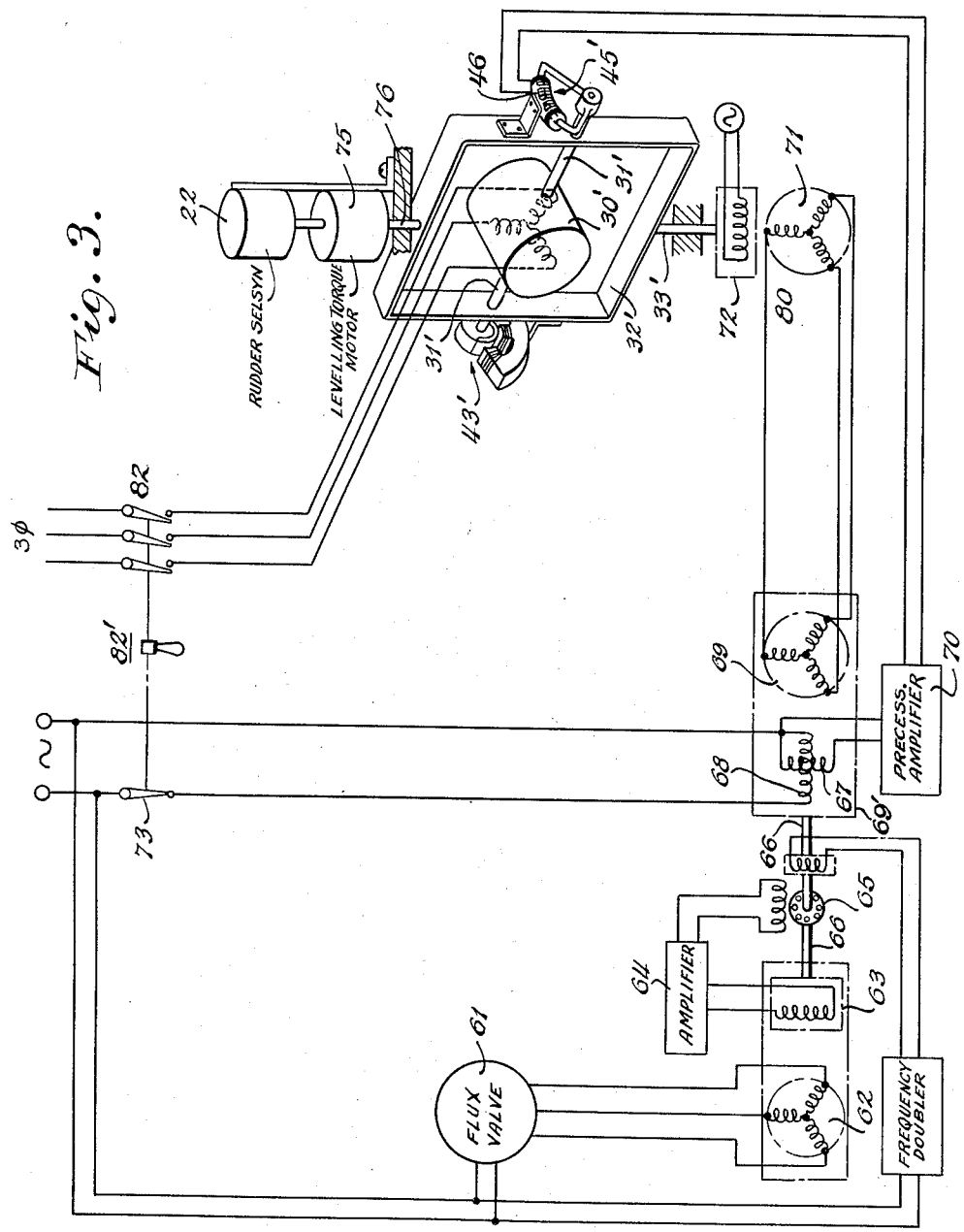

Patented Oct. 10, 1950

2,524,756

UNITED STATES PATENT OFFICE 2,524,756

PRESETTING MEANS FOR GYROMAGNETIC COMPASSES

Frederick D. Braddon, Babylon, N. Y., Gerard P. de Westfelt, Chevy Chase, Md., and Richard S. Brannin, East Williston, N. Y., assignors to The Sperry Corporation, a corporation of Delaware Application March 31, 1945, Serial No. 585,984

11 Claims. (Cl. 33—222)

This invention relates to gyro magnetic compass systems of the kind in which a directional gyro is made to integrate or average the movements of a magnetic compass instrument and thereby to provide a non-oscillatory reference heading based on the direction of the earth's magnetic field for steering the craft in which the system is employed. Gyro magnetic combinations of this general type are well known, and particular forms described in Patent No. 2,414,448, issued January 21, 1947, to Leslie F. Carter, and Patent No. 2,363,500, issued November 28, 1944, to the same inventor, both for Gyro-Magnetic Compass Systems, may be referred to as examples. Other known forms use a flux valve type of magnetic compass as the controller for the gyroscope as in Patent No. 2,357,319, issued on September 5, 1944, to Esval and Frische for Flux Valve Magnetic Compasses.

It is usual and important in such systems to arrange the control of the gyroscope so that it will follow the wanderings of the magnetic compass very slowly, but this slow-following characteristic has the disadvantage that each time the system is started up, the direction of the gyro axle may differ at first from the direction of the magnetic compass needle by a large angle; and, consequently, a considerable delay may occur before the slowly moving gyroscope has lined itself up with the compass.

It is an important feature of this invention to provide automatic means for bringing the gyro very quickly into line with the magnetic meridian when the equipment is first switched on, directly turning the gyro in azimuth by a motor, before the rotor has started, or as it starts.

Another feature of the invention is to provide a method of and means for controlling from a remote station the operation of a gyro magnetic compass of the type indicated.

Another feature of the invention is the provision of a delayed action starting circuit which automatically disconnects the quick-orienting means and restores normal connections after the gyro has been lined up.

In most gyro magnetic compass systems, the gyroscope is provided with two torque-applying devices, one acting about the horizontal axis of the gyro and controlled by departure of the gyroscope from its meridian position, or in other words, by loss of synchronism of the gyroscope with the magnetic meridian or compass. The other torque-applying device normally applies a torque about the vertical axis and is controlled by a levelling arrangement responsive to tilt of the gyro spin axis from its normal horizontal position. In the preferred form of our invention, we employ the torque means acting about the vertical as a quick synchronizing device during the starting up period of the gyro, by diverting the signal, resulting from loss of synchronism of the gyro, to control the torque means about the vertical axis instead of acting to control the torque means about the horizontal axis. On the other hand, when synchronism is obtained and the gyro is approximately up to speed, the normal operating conditions are restored, so that the horizontal torque means is controlled from the synchronizing signal and the vertical torque means controlled by the levelling signal.

Other objects and advantages of the invention will be understood from the following description and the accompanying drawings in which concrete embodiments are shown for purposes of illustration of the principles.

Fig. 1 is a perspective view of a controlled gyroscope of a well-known type to which the invention may be applied;

Fig. 3 is a diagram of an alternative method of carrying our invention into effect.

Figure 2B:
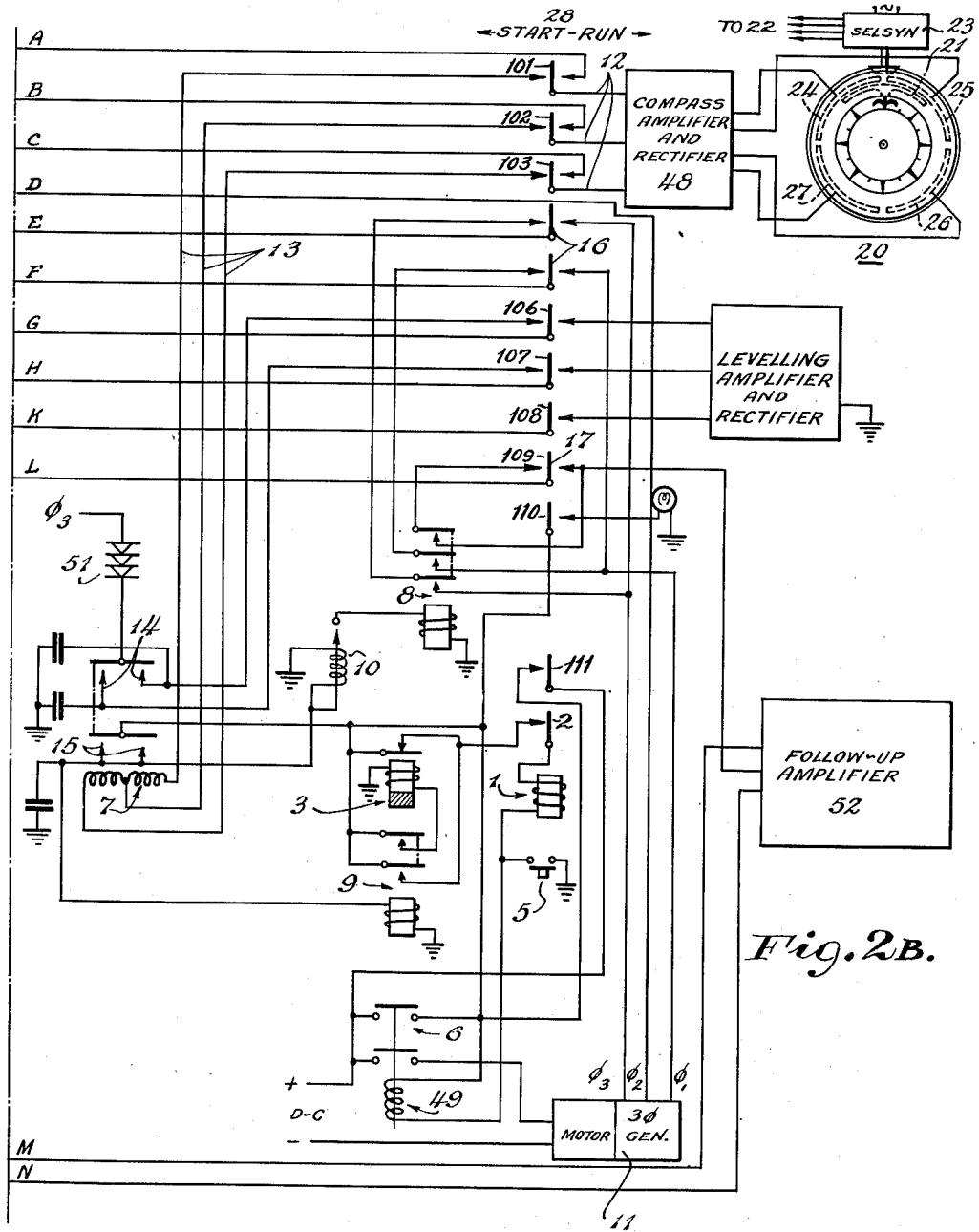
Fig. 2 is a complete diagram of one form of our improved system in two parts 2A and 2B.

Referring to Fig. 1, the directional gyro rotor (not shown) is contained in the rotor casing 30 which is mounted on horizontal pivots 31, 31 in a vertical ring 32 pivoted freely for rotation in azimuth in upper and lower guide bearings 33. A follow-up element 34 is preferably mounted above the gyro in bearing 35, coaxial with guide bearings 33 and arranged to be power driven by a follow-up motor 36 and worm gear 37. The same shaft 38 which carries the follow-up element carries also the rotor of a self-synchronous transmitter 22, which controls the position of a self-synchronous motor 23 at the magnetic compass.

Follow-up element 34 also carries a sensitive pick-off 39 preferably of the inductive type, which cooperates with an armature 40 carried on the vertical ring 32. Mounted on the underside of follow-up element 34 are two electromagnets 41, either of which may magnetically attract the armature 42 carried on axle 33 which is solid with the vertical ring 32, thereby applying a couple to said vertical ring round the vertical axis in one direction or the other, when one or the other of the electromagnets is excited. The horizontal axle 31, which supports the gyro casing, carries at one end a curved soft-iron armature 43 which cooperates with an inductive pick-off 44 similar to pick-off 39 and supported by the vertical ring 32. Alternatively, said pick-off 44 might be carried on the follow-up element 34. The other end of axle 31 carries a pair of curved magnets 45 with like poles facing one another at a short distance apart. This separating space is normally at the middle of a curved solenoid 46 also carried on the vertical ring 32. Solenoid 46 has a mid-tapped winding connected as shown in Fig. 2 in a differential bridge circuit, the arrangement being such that when the electric current predominates in one or the other half of the winding, a couple is applied round the horizontal axis 31 in one direction or the other, depending on the sense of the predominating current in the solenoid.

The normal operation of the apparatus is as follows. So long as the follow-up element 34 is in its normal position with relation to vertical ring 32, the follow-up transformer or pick-off 39 is immediately above the armature 40 and no signal is transmitted, but when follow-up element 34 is displaced with respect to vertical ring 32, a signal results which, after amplification, is applied to follow-up motor 36 so as to cause follow-up element 34 to line itself up with vertical ring 32. The winding of the solenoid 46 is normally energized through a suitable amplifier from the magnetic compass in such a manner that so long as the gyro axle is in line with the compass needle, no current will pass through the solenoid. When, however, the gyro axle is out of line with the compass, the differential current through the double solenoid 46 flows in one direction or the other depending upon the sense of the relative displacement of the gyro. The solenoid then, through curved magnets 45, applies to the gyro a couple round the horizontal axis 31 and causes it to precess in azimuth so as to line up with the magnetic compass.

The electromagnets 41, 41 are used to cooperate with the radial armature 42 so as to provide a couple round the vertical axis of the gyro in order to erect it if the gyro axle becomes tilted from the horizontal. These electromagnets are controlled by the tilt pick-off 44 cooperating with its armature 43 so that whenever a tilt of the gyroscope develops, a couple will be applied round the vertical axis by magnets 41 in such a sense as to cause a precession to level the gyro axle.

Referring now to Fig. 2, the controlling magnetic compass is shown at 20 and the means by which it controls the gyroscope, as shown in the present instance, consist of a differential multipart condenser such as described in the Carter Patent No. 2,363,500. One curved plate 21 is carried by the moving magnetic system and cooperates with four quadrant plates 24, 25, 26 and 27 turned by Selsyn motor 23 whereby a signal is produced depending on the relative position of said system of four plates and the moving plate 21. This signal, after amplification and rectification by the compass amplifier and rectifier 48, is applied under normal conditions as already described to the horizontal torque devices 45, 46 on the gyro.

When the follow-up element 34 turns to line up with the gyro axle, it drives the rotor of the self-synchronous transmitter 22 which operates self-synchronous receiver 23 on the magnetic compass. Receiver 23 is coupled so as to rotate the four-plate condenser system 24, 25, 26 and 27 in the requisite direction to bring its normal point opposite the mid-point of the moving plate 21 at which stage the signal to the compass amplifier 48 will drop to zero.

During the operation of initial synchronization, however, the output from the compass amplifier according to our invention is applied to the magnets 41 in order to give a torque round the vertical axis independent of the tilt of the gyro axle. If this synchronizing torque is applied before the gyroscope has begun to spin or while it is only spinning very slowly, the gyro yields easily to the direct action of the torque thereby displacing the azimuth pick-off 39 to operate the follow-up motor and drive the vertical ring, gyro and self-synchronous transmitter 22 in accordance with the compass error signal.

The means which we have invented for changing over the output of the compass amplifier 48 to effect this synchronization, and for automatically changing it back when synchronization is complete, will now be described with reference to Fig. 2.

The change-over is accomplished by means of a multiple switch 28 connected as shown. Said switching means is so devised as first to make such connections that the compass amplifier output is applied to the magnets 41, 41 normally used for erection, and then, after allowing time for the amplifier to warm up, to change the connection so as to start the gyro and the erecting means. When synchronization is complete, switch 28 is automatically released and moved over by a spring, not shown, from the starting to the running position and normal operation comes into effect.

Referring to Fig. 2B and considering the blades of the multipole switch 28 in order from the top downwards, it will be observed that the first three blades 101, 102 and 103 deal with the output of the amplifier 48 to which their hinges are connected by the line 12.

In the starting position the amplifier is joined through lines 13 to the windings of the synchronizing relay 7 which connects the three phase supply through rectifier 51 to one or the other of contacts 14, thence through blades 106 or 107 of switch 28, and lines G or H to torque coil 41. Also, in the starting position, blades 16 through lines E and F connect the first and third phases of the gyro stator winding 53 through transfer relay 8 to the corresponding output terminals of motor alternator 11; the second phase of the gyro stator being permanently connected through line D to the motor generator. At the same time blades 106, 107 and 108, at starting, disconnect the levelling amplifier from the system; blade 17 disconnects one phase of the output of the follow-up amplifier from direct connection with one phase of the follow-up motor 36 and diverts it through the delay switch 8; and blade 110 cuts off the indicator lamp. Also, in the starting position, blade 111 connects the positive of the D. C. supply to coil 49 of contactor switch 6 to ground through the normally closed switch 5; and blade 2 closes a circuit to ground through the upper contact of slow-release relay 3 and holding coil 1. Said coil then holds the complete switch in the starting position until it is released by the opening of slow-release relay 3.

In the running position, the output of amplifier 48 goes direct through blades 101, 102 and 103 to solenoid 46, the three phase supply goes directly to the windings of gyro stator 53 through blades 16; the levelling amplifier is connected to the levelling coils 41 through blades 106 and 107, and to the tilt pick-off 44 through blade 108; the follow-up motor is energized through blade 109; the signal lamp is energized through blade 110; the circuit of the upper contact of the contactor switch 6 through blade 111 is opened; and the holding coil 1 is disconnected by blade 2.

The sequence of the operations is as follows. The stop button 5 is closed for starting and multipole switch 28 is first turned by hand against a spring to the "start" position in which it is held by the holding coil 1 which is energized from the position of the D. C. supply via contact 2 and slow release relay 3. Stop button 5 is closed to initiate the operation of the apparatus and is kept in this position while the apparatus is running. When the button 5 is opened by hand the power supply to the apparatus is switched off. When switch 28 is closed in the starting position, the contactor switch 6 is also closed by its exciting coil 49, and this starts up the motor generator 11 which provides three phase A. C. for driving the gyro rotor 53 and operating the amplifier 52 and control devices. No connections are shown herein for supplying energy to the amplifiers from the generator 11. Contactor 6 locks its own winding 49 to ground through stop button 5. The follow-up amplifier 52 starts to warm up the moment the motor generator 11 is started but the normal connection to motor 36 is delayed by time delay switch 10 so as to prevent drifting of the follow-up before the compass amplifier has warmed up to control the synchronizing cycle.

The closing of switch 28 to the starting position further transfers the compass amplifier leads 12 through leads 13 to the windings of synchronizing relay 7 so that the amplifier output now energises the coil of relay 7 instead of solenoid 46. Relay 7 then connects the leveling coils 41 on the gyro to a source of rectified A. C. via contacts 14 of relay 7 and electrolytic or diode rectifier 51.

At the same time, the main switch 28 connects gyro phases 1 and 3 and the output of the follow-up amplifier 52 to transfer relay 8. After the compass amplifier 48 has warmed up, its output signal appears and energizes relay 7 in one sense or the other thereby causing one of the coils 41 to preponderate over the other. In this way, the output from the compass amplifier is now applied to the leveling magnets 41 instead of to the azimuth precessing solenoid 46 as in normal operation.

The synchronizing relay 7, via the pair of contacts 15, also serves to apply direct current to both the auxiliary holding relay 9 and the normally open thermal time delay relay 10. Relay 9 closes and applies direct current to holding coil 1 and at the same time it energizes the slow release relay 3.

The slow release relay 3 then operates and breaks the initial path of current to the coil 1 which holds multiple switch 28 against the spring in the starting position, but said switch 28 nevertheless remains locked by the auxiliary holding relay 9 and therefore under the control of the synchronizing relay 7.

The time delay relay 10 closes after an interval of about 30 to 50 seconds and energizes the transfer relay 8 which closes, and energizes the gyro motor 53 via contacts 16 on switch 28 and simultaneously closes the follow-up amplifier output connection to the follow-up motor.

One of the coils 41 on the follow-up element 34 of the gyro being energized in accordance with the compass error signal, as already explained, pulls armature 42 against its pole, turning the vertical ring 32 and the gyro 30 with it round axis 33 in the shortest direction to reach the magnetic meridian. The follow-up pick-off 39 then comes into action and starts the follow-up motor and causes the follow-up element 34 to follow the gyro but without overtaking it since the armature 42 continues to be attracted by the magnets 41. Rotation round the vertical therefore continues until the gyro is lined up with the magnetic compass at which point the differential output from the compass amplifier 48 drops to zero. Synchronizing relay 7 then opens and the coils 41 both become de-energized. When synchronizing relay 7 releases, the auxiliary holding relay 9 releases, switch holding coil 1 releases, and switch 28 is moved over by the spring to the running position. The levelling amplifier then applies current as requisite to one of the magnets 41 so as to bring the gyro axle level while the gyro is coming up to speed and the system continues thereafter to operate in the normal manner. The whole system can be switched off at any time by pushing the stop button 5 which releases contactor 6 and thus disconnects the power supply to the motor generator 11.

For simplicity of explanation, the compass element has been described in this specification as a magnetic compass with a needle system of the ordinary kind, but it will be apparent that the invention is equally applicable to other compass-like devices such as a flux valve as described in the aforesaid Esval and Frische patent which may have no moving parts but are capable of giving an unambiguous electrical signal depending on the orientation of the compass frame with respect to the earth's magnetic field.

One alternative method of carrying our invention into effect and using the flux valve type of magnetic compass is shown in Fig. 3. The directional gyro is shown as consisting as before of a rotor (not shown) spinning in a casing 30' supported on horizontal trunnion bearings 31', 31' in a vertical ring 32' mounted for rotation about a vertical axis upon shaft 33'. The vertical shaft 76 attached to the vertical ring may carry a leveling torque motor 75 which is the equivalent of the coils 41 and armature 42 of Fig. 1 and is controlled by a controller 43' as before. A torque 45' as before applies couples round the horizontal axis 31' of the gyroscope normally to vary its azimuth under the control of the flux valve compass 61.

The flux valve compass 61 delivers currents to the three-phase windings 62 which form the stator of the transmitter or signal generator. The rotor of the transmitter has a single winding 63 which is driven by follow-up motor 65. The arrangement is such that when the flux valve 61 does not lie in the same position relatively to the magnetic meridian as winding 63 with respect to winding 62, an alternating voltage will be induced in rotor winding 63. The voltage from rotor winding 63 is applied to the amplifier 64, which drives the follow-up motor 65 so as to bring the rotor to the null point. Said motor, which is the equivalent of motor 36 in Fig. 1, is shown as of the two-phase type, one phase 65 being supplied from the single phase supply through a frequency doubler. The shaft 66, driven by the follow-up motor, therefore represents a power-driven compass element.

It is usual to drive with said element one unit 69' of a Selsyn signal generator which produces a signal for controlling the torquer 45' on the gyroscope, upon relative displacement of shaft 66 and the shaft 33' of the gyroscope, the other unit 80 being at the gyroscope, which normally operates as a transmitter. For this purpose, the three-phase winding 69 is connected to winding 71 of transmitter 80, the rotor 72 of which is connected to shaft 33' of the vertical ring 32'. According to this invention we so construct this unit 69' that when the gyromagnetic compass is being initially synchronized, it temporarily acts as a transmitter to control unit 80, acting as a repeater motor to synchronize the gyro with the flux valve compass. To this end said rotor has two windings 67 and 68 in addition to its three-phase stator winding 69. In normal working only rotor winding 67 is used as a signal generator to control the directional gyro through the precession amplifier 70 and the torque motor or torquer 45' in a known manner.

So long as the direction of the flux in rotor winding 67 at the compass agrees with that of winding 72 at the directional gyro, there will be no output from the former. If, however, the directional gyro is out of line with the magnetic meridian, as indicated by the flux valve and shaft 66, the winding 67 will generate a voltage which will operate torque motor 45' through amplifier 70 and cause the gyro to precess towards the magnetic meridian. The second rotor winding 68 driven by the follow-up motor 65 is used for the purpose of quickly bringing the directional gyro into synchronism when starting up and before the gyro is spinning. By means of a switch 73, said winding 68 is temporarily excited from the same source of alternating current as winding 72 of the gyro transmitter 80. The two instruments 80 and 69' then temporarily exchange roles or at least change their roles, 69' becoming the transmitter and 80 becoming a repeater. Viewed in a different way, the control signal generated by the unit 69' is transferred from the torquer 45' to the Selsyn 80, acting as a repeater motor, thereby applying a torque about the vertical axis of the gyroscope. Since the rotor of the instrument 69' is driven by the follow-up motor 65 while the rotor of instrument 80 is carried on the vertical shaft 33' of the directional gyro which, as it is not spinning appreciably, will turn very freely around the vertical axis, the instrument 80 will turn the directional gyro until it is lined up with the winding 67 of the rotor of instrument 69'.

When this has been done, switch 73 is opened, and at the same time the power supply is switched on through multiple switch 82 to start the gyro spinning and to energize the precession amplifier 70, whereupon the apparatus will continue to function in the ordinary way, with azimuth control of the gyro being exercised by torque motor 45' under the control of amplifier 70 and rotor winding 67. Preferably, the switches 73 and 82 are connected to the same control handle 82' in such manner that the above-stated sequence of operation takes place.

Since many changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. In a gyro magnetic compass system having a magnetic compass signal device and means normally controlled thereby exerting a couple round the horizontal axis of the gyro to cause it normally to follow the compass in azimuth, automatic means for quickly lining up the gyro axle with reference to the magnetic meridian at starting, including means adapted to exert in starting a temporary couple round the vertical axis, and means for temporarily transferring the compass signal from the control of said first couple producing means to the control of said second couple producing means during starting.

2. In a gyro magnetic compass system having a magnetic compass signal device and means normally controlled thereby exerting a couple round the horizontal axis of the gyro to cause it to follow the compass in azimuth, automatic means for quickly lining up the gyro axle with reference to the magnetic meridian at starting, including means adapted when excited to exert a couple round the vertical axis, and means for temporarily transferring the compass signal from the control of said first couple producing means to the control of said second couple producing means during starting, said last-named means including means for delaying the application of current to the gyro motor, and means for automatically restoring the normal running connections after the gyro has been lined up with the compass.

3. In a gyro magnetic compass system in which couples are normally applied to the gyro around the vertical axis for levelling, and around a horizontal axis for slaving the gyro to the compass, and having a tilt detector normally controlling the former and a loss-of-synchronism detector for controlling the latter, of means for transferring the control of the former couple means to the latter detector temporarily at the time of starting so as quickly to line up the non-spinning or slowly spinning rotor axis to agree with the magnetic compass.

4. In a gyro magnetic compass system in which couples are normally applied to the gyro around the vertical axis for levelling, and around a horizontal axis for slaving the gyro to the compass, and having a tilt detector normally controlling the former and a loss-of-synchronism detector for controlling the latter, of means for transferring the control of the former couple means to the latter detector temporarily at the time of starting so as quickly to line up the non-spinning or slowly spinning rotor axis to agree with the magnetic compass, and means for automatically re-establishing normal operation when lining up is accomplished.

5. In a gyro magnetic compass system in which couples are normally applied to the gyro around the vertical axis for levelling, and around a horizontal axis for slaving the gyro to the compass, and having a tilt detector normally controlling the former and a loss-of-synchronism detector for controlling the latter, means for transferring the control of the former couple to the latter detector temporarily at the time of starting the gyro rotor so as quickly to line up the non-spinning or slowly spinning axle to agree with the magnetic compass, and means for automatically re-establishing normal operation when lining up is accomplished, both of said last-named means including a multipole change-over switch having starting and running positions, adapted to be set into the starting position by hand and to return automatically to the running position as soon as the gyro is lined up with the magnetic compass.

6. In a gyro magnetic compass system having electrical torque means for applying torque about the horizontal and the vertical axis of the gyro and a signal device responsive to loss of synchronism with the compass, switching means for transferring the compass signal from the control of the torque about the horizontal axis to the control of the torque about the vertical axis of said gyro comprising a compass amplifier, a synchronizing relay, a hand-operated switch for connecting said amplifier to the windings of said relay, contacts on said synchronizing relay for connecting a source of current to said vertical axis torque applying means, a holding relay for retaining said switching means in the starting position and a second set of contacts on said synchronizing relay adapted to break the circuit to said holding relay on disappearance of said compass signal.

7. A gyro magnetic compasss system, as claimed in claim 6, including a transfer relay for controlling the supply of energy to spin the rotor of the gyro, and a time delay switch adapted to bring said transfer relay into operation after a delay sufficient to ensure that said amplifier is warmed up to operating temperature.

8. In a gyro-magnetic compass system having a signal means responsive to lack of synchronism between the gyro and compass and means normally controlled thereby exerting a couple around the horizontal axis of the gyro to cause it to follow the compass in azimuth, means for quickly lining up the gyro with reference to the magnetic meridian at starting, including means adapted when excited to exert a couple round the vertical axis, means for temporarily transferring said compass signal means from the control of said first couple producing means to the control of said second couple producing means during starting, and means for automatically restoring the normal running connections after the gyro has been lined up with the compass.

9. In a gyro magnetic compass system having a directional gyro, a magnetic compass, signal means for producing a signal upon relative displacement in the orientation of said directional gyro and said compass, and means controlled by said signal for normally exerting a couple round the horizontal axis of the gyro causing it to follow the compass in azimuth, auxiliary electromagnetic means adapted to exert in starting a temporary couple round the vertical axis thereby orienting the gyro round said axis to line up the gyro axle quickly with the compass and means for temporarily diverting said compass signal during starting from the control of said first couple exerting means to the control of said auxiliary means.

10. Quick-synchronizing means for gyro-magnetic compasses, comprising a two-unit Selsyn device, one unit at the magnetic compass and the other at the gyro, said one unit having a movable winding controlled by the azimuthal position of the magnetic compass and electrically connected to means for applying a torque about the horizontal axis of the gyro, said other unit having one of its windings positioned in accordance with the azimuthal position of the gyro and the other of its windings connected to a current supply, the one unit normally producing a signal for operating said horizontal gyro axis torque applying means upon disagreement in the azimuthal positions of the magnetic compass and gyro, said one unit having an additional winding that, when excited, converts the one and other units of the device into a Selsyn transmitter and Selsyn repeater respectively, and means for exciting said additional winding under starting conditions to quickly synchronize the gyro with the magnetic compass.

11. Means of the character claimed in claim 10, including a sequentially operable starting switch having two parts, the initially effective part of which is connected to said additional winding and the secondly effective part of which is connected to the spinning motor for the gyro.

FREDERICK D. BRADDON.
GERARD P. de WESTFELT.
RICHARD S. BRANNIN.

REFERENCES CITED

The following references are of record in the file of this patent:

UNITED STATES PATENTS

| Number | Name | Date |
|---|---|---|
| 2,140,191 | Schuchardt | Dec. 13, 1938 |
| 2,307,788 | Nisbet et al. | Jan. 12, 1943 |
| 2,421,042 | Thompson | May 27, 1947 |

FOREIGN PATENTS

| Number | Country | Date |
|---|---|---|
| 871,085 | France | Jan. 3, 1942 |

Certificate of Correction

Patent No. 2,524,756                          October 10, 1950

FREDERICK D. BRADDON ET AL.

It is hereby certified that error appears in the printed specification of the above numbered patent requiring correction as follows:

Column 4, line 27, for the word "multiple" read *multipole*; column 5, line 15, for "position" read *positive*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*